United States Patent
Chrysler et al.

(10) Patent No.: US 12,332,468 B2
(45) Date of Patent: Jun. 17, 2025

(54) SYSTEMS AND METHODS FOR MANUFACTURING AND REPLICATING HOLOGRAPHIC OPTICAL ELEMENTS AND HOLOGRAPHIC WAVEGUIDE COUPLERS

(71) Applicant: Arizona Board of Regents on Behalf of the University of Arizona, Tucson, AZ (US)

(72) Inventors: Benjamin D. Chrysler, Tucson, AZ (US); Jianbo Zhao, Tucson, AZ (US); Raymond K. Kostuk, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 431 days.

(21) Appl. No.: 18/002,738

(22) PCT Filed: Jun. 16, 2021

(86) PCT No.: PCT/US2021/037659
§ 371 (c)(1),
(2) Date: Dec. 21, 2022

(87) PCT Pub. No.: WO2021/262504
PCT Pub. Date: Dec. 30, 2021

(65) Prior Publication Data
US 2023/0244021 A1 Aug. 3, 2023

Related U.S. Application Data

(60) Provisional application No. 63/042,417, filed on Jun. 22, 2020.

(51) Int. Cl.
*G02B 5/32* (2006.01)
*G02B 5/00* (2006.01)
(Continued)

(52) U.S. Cl.
CPC ............... *G02B 5/32* (2013.01); *G02B 5/003* (2013.01); *G02B 5/045* (2013.01); *G02B 5/26* (2013.01); *H01S 3/094* (2013.01)

(58) Field of Classification Search
CPC .......... G02B 5/32; G02B 5/003; G02B 5/045; G02B 5/26; G02B 5/00; G02B 5/04;
(Continued)

(56) References Cited

U.S. PATENT DOCUMENTS 5,781,317 A 7/1998 Kawazoe et al.
7,710,623 B2 * 5/2010 MacMaster .......... G03H 1/0408
359/12

(Continued)

FOREIGN PATENT DOCUMENTS

WO 2019217409 A1 11/2019

OTHER PUBLICATIONS

Bruder, Friedrich-Karl, et al., "Mass production of volume holographic optical elements (vHOEs) using Bayfol® HX photopolymer film in a roll-to-roll copy process" In Practical Holography XXXI: Mater & Applns, vol. 10127, p. 101270 Int'l Soc. Optics & Photon.
(Continued)

*Primary Examiner* — Balram T Parbadia
(74) *Attorney, Agent, or Firm* — Perkins Coie

(57) ABSTRACT

Methods and systems are described that enable manufacturing of holograms with high spatial frequencies and allow composite master holograms to be formed in reflection configurations. An example system for replicating transmission-type holographic elements includes one or more prisms positioned to receive an illumination beam on a first face. A composite master holographic element is positioned in contact with a second face of the one or more prisms to receive the illumination beam after propagation through he one or more prisms. The composite master hologram includes a
(Continued)

reference beam component and an object beam component. The replication hologram is positioned in contact with a third face of the one or more prisms to receive, upon illumination of the master HOE by the illumination beam, a holographic exposure comprising first order diffracted illumination from both the reference beam component and object beam component at an exposure region of the copy HOE.

20 Claims, 15 Drawing Sheets

(51) Int. Cl.
*G02B 5/04* (2006.01)
*G02B 5/26* (2006.01)
*H01S 3/094* (2006.01)

(58) Field of Classification Search
CPC .............. H01S 3/094; G03H 1/0402; G03H 2001/0415; G03H 2223/18; G03H 1/0248; G03H 1/20; G11B 7/26; G11B 7/28
See application file for complete search history.

(56) References Cited

U.S. PATENT DOCUMENTS

| 8,614,842 | B2 | 12/2013 | Aspnes et al. |
| 2004/0175627 | A1 | 9/2004 | Sutherland et al. |
| 2007/0223070 | A1* | 9/2007 | Balistreri ............. G11B 7/0065 |
| 2009/0168129 | A1* | 7/2009 | Raguin ................. G11B 7/083 359/12 |
| 2016/0276514 | A1* | 9/2016 | Simavoryan ............ H10F 77/45 |
| 2018/0138346 | A1* | 5/2018 | Simavoryan ............ H10F 77/45 |
| 2018/0210396 | A1* | 7/2018 | Popovich ............... G03H 1/202 |

OTHER PUBLICATIONS

Chrysler, Benjamin D., and Raymond K. Kostuk. "Volume hologram replication system for spectrum-splitting photovoltaic applications." Applied optics 57, No. 30 (2018): 8887-8893.

International Search Report & Written Opinion mailed Sep. 24, 2021 for International Patent Application No. PCT/US2021/037659 (19 pages).

Russo, Juan Manuel, Fedor Dimov, Joy Padiyar, and Seth Coe-Sullivan. "Mass production of holographic transparent components for augmented and virtual reality applications." In Solid-State Lighting, pp. SW3C-1. Optical Society of America, 2017.

Stojanoff, Christo G. "Review of the technology for the manufacturing of large-format DCG holograms for technical applications." In Practical Holography XI & Holographic Materials III, vol. 3011, pp. 267-279. Int'l Society for Optics and Photonics, 1997.

Tipton, Douglas F. "New hologram replicator for volume holograms and holographic optical elements." In Holographic Materials IV, vol. 3294, pp. 136-145. International Society for Optics and Photonics, 1998.

* cited by examiner

SYSTEMS AND METHODS FOR MANUFACTURING AND REPLICATING HOLOGRAPHIC OPTICAL ELEMENTS AND HOLOGRAPHIC WAVEGUIDE COUPLERS

STATEMENT REGARDING FEDERALLY SPONSORED RESEARCH

This invention was made with government support under Grant Nos. 1041895 and 1143953, awarded by NSF. The government has certain rights in the invention.

CROSS-REFERENCE TO RELATED APPLICATION(S)

This patent document is a 371 National Phase Application of International Patent Application No. PCT/US2021/037659, filed Jun. 16, 2021, which claims priority to the provisional application with Ser. No. 63/042,417 titled "SYSTEMS AND METHODS FOR MANUFACTURING AND REPLICATING HOLOGRAPHIC OPTICAL ELEMENTS AND HOLOGRAPHIC WAVEGUIDE COUPLERS," filed Jun. 22, 2020. The entire contents of the above noted applications are incorporated by reference as part of the disclosure of this document.

TECHNICAL FIELD

The disclosed embodiments relate to methods, systems and devices for fabrication and replication of holographic elements.

BACKGROUND

Volume holographic optical elements (VHOE) are a type of diffractive optical element with applications in solar energy, display systems, security, and medical imaging. Although the field advanced rapidly after the invention of the laser in the 1960's, VHOEs have been primarily used as custom elements in niche commercial applications or in laboratory experiments. Recent advances in photopolymer material technology and the prospect of augmented and virtual reality markets have spurred renewed interest in manufacturing technologies for VHOEs.

SUMMARY

The disclosed embodiments relate to methods, systems and devices that, among other features and benefits, enhance the simplicity of fabrication and quality of the master holograms, enable manufacturing of holograms with high spatial frequencies, and allow master holograms to be formed in reflection configurations. One example system for replicating transmission-type HOEs includes one or more prisms positioned to receive an illumination beam on a first face thereof, and a composite master HOE in contact with a second face of the one or more prisms to receive the illumination beam after propagation through the one or more prisms. The composite master HOE includes a reference beam component and an object beam component. The system further includes a copy HOE positioned in contact with a third face of the one or more prisms to receive, upon illumination of the master HOE by the illumination beam, a holographic exposure comprising first order diffracted illumination from both the reference beam component and object beam component at an exposure region of the copy HOE.

DETAILED DESCRIPTION

Figure 1A:
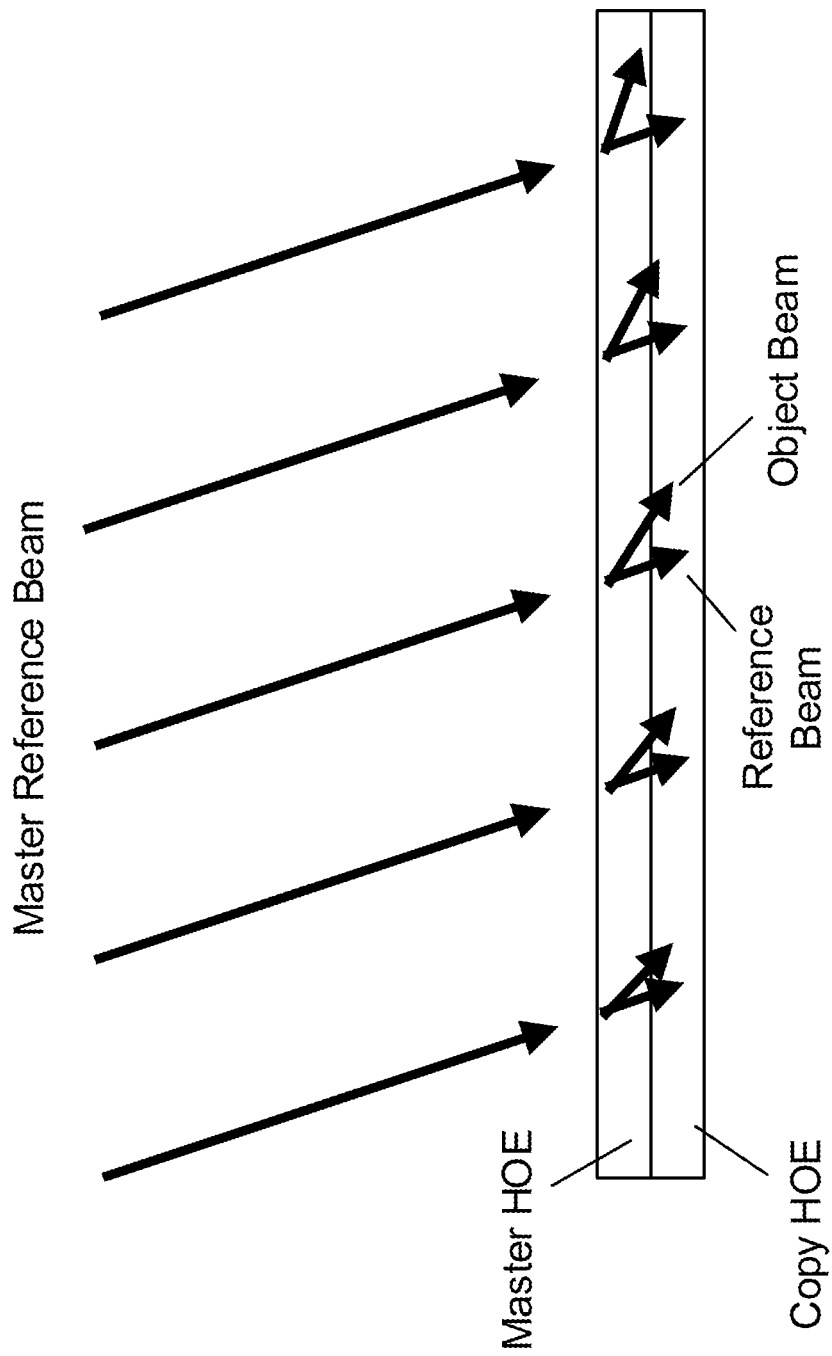
FIG. 1A illustrates a configuration for producing a volume holographic optical element (VHOE) using a contact-copy method.

Most industrial VHOE manufacturing has been based on contact-copy technology. FIG. 1A illustrates a typical configuration for the contact-copy method that includes placing a master hologram in close contact with the replication hologram. When illuminated with the replication hologram's reference beam, the master hologram diffracts the reference beam and generates the object beam. The reference beam and diffracted object beam then interfere to form the replication hologram. In order to have an ideally balanced beam ratio, transmission-type master holograms have 50% diffraction efficiency while reflection-type master holograms have 100% diffraction efficiency. Contact-copy is widely used since the use of a master hologram simplifies the design of the replication system and enhances the stability and reproducibility of the process compared to two-beam interference setups typically used in laboratories. However, there are a variety of challenges in fabricating contact-copy master holograms and implementing them in replication systems, particularly when the object and reference beams are non-planar or the aperture of the VHOE needs to be well-defined.

Figure 1B:
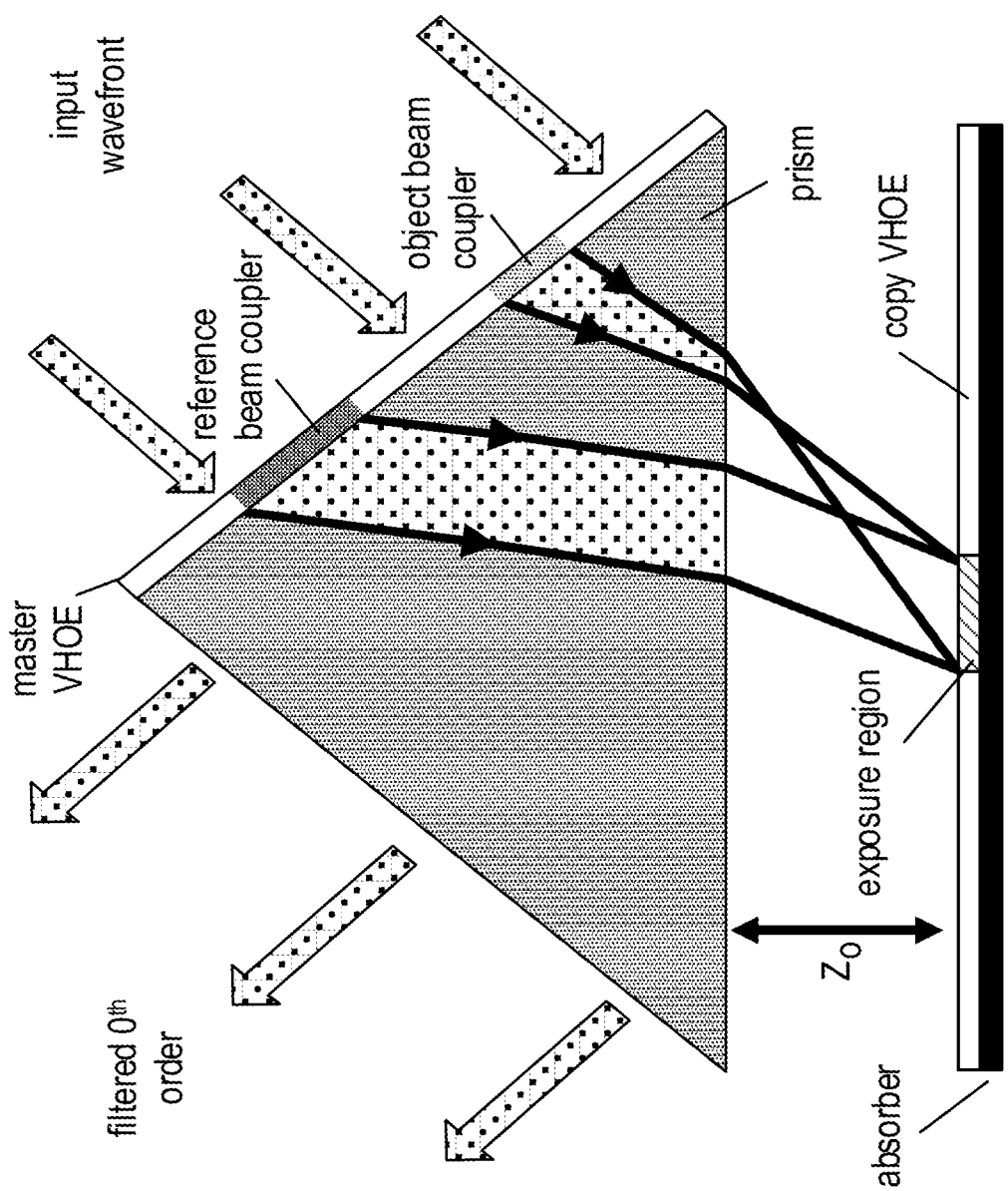
FIG. 1B illustrates a configuration for producing a volume holographic optical element (VHOE) using a prism-coupled replication technique.

A prism-coupled replication technique was recently developed to address some of these challenges. One of the main features of this technique is a composite master hologram in which component holograms generate object and reference beams when illuminated with a single illumination beam. A diagram of the prism-coupled replication technique is shown in FIG. 1B. In this configuration, input wavefront is provided to one face of a prism (e.g., from the right side as depicted in FIG. 1B) and is incident on the master HOE that includes distinct object and reference beam coupling elements in a master hologram. A copy hologram ("copy VHOE") is positioned at a specified distance, $Z_0$, from the prism. The reference and object beams that are transmitted through the bottom face of the prism overlap at an exposure region on the copy hologram to form the holographic exposure, while the unwanted $0^{th}$ order light is filtered from the prism (e.g., transmitted out of the prism on the left side) by total internal reflection. This technique was demonstrated to reliability manufacture volume holographic lens arrays with high diffraction efficiency.

While the configuration in FIG. 1B includes an air gap that can provide some advantages in applications, such as solar cell system, that require certain dispersive properties, such an air gap also limits the manufacturing of holograms with high spatial frequencies that cause the diffracted beams to have greater angles than the total internal reflection limit. This limitation is inherent in the system since the prism is not in contact with the replication photopolymer material so the beam angles within the material cannot exceed the total internal reflection (TIR) limit and thus cannot form gratings that diffract beyond the critical angle. While the configuration may still be used for some waveguide holograms if the reconstruction wavelength is sufficiently higher than the construction wavelength, it may limit its use in waveguide applications for use in the visible spectrum. In addition, such a technique was shown to only operate with a transmission-type master hologram that was used in a transmission configuration.

The disclosed embodiments use composite master holograms and prism-coupled configurations that overcome the above noted shortcomings of the prior systems, and, among other features and benefits, enable manufacturing of holograms with high spatial frequencies, allow the composite master holograms to be formed in reflection configurations, and enhance the simplicity of fabrication and quality of the master holograms. The disclosed techniques retain the advantages of the prism-coupled technique but are capable of fabricating and replicating a wider variety of holograms, including waveguide holograms that have potential for commercial applications such as augmented reality displays, and solar energy systems. In some embodiments related to configurations for replicating transmission holograms, a composite master hologram is attached to a prism and diffracts object and reference beams towards the replication photopolymer forming the exposing beams. The disclosed embodiments further relate to methods and systems for fabricating transmission-type and reflection-type master holograms. In some embodiments, a hybrid technique related to fabricating reflection-type holograms, a combination of a master hologram attached to a prism is used to generate the object beam and a contact-copy master hologram to generate the reference beam. Further details regarding these and other disclosed embodiments are described herein.

Example Configurations for Producing Transmission-Type Holograms

Figure 2A:
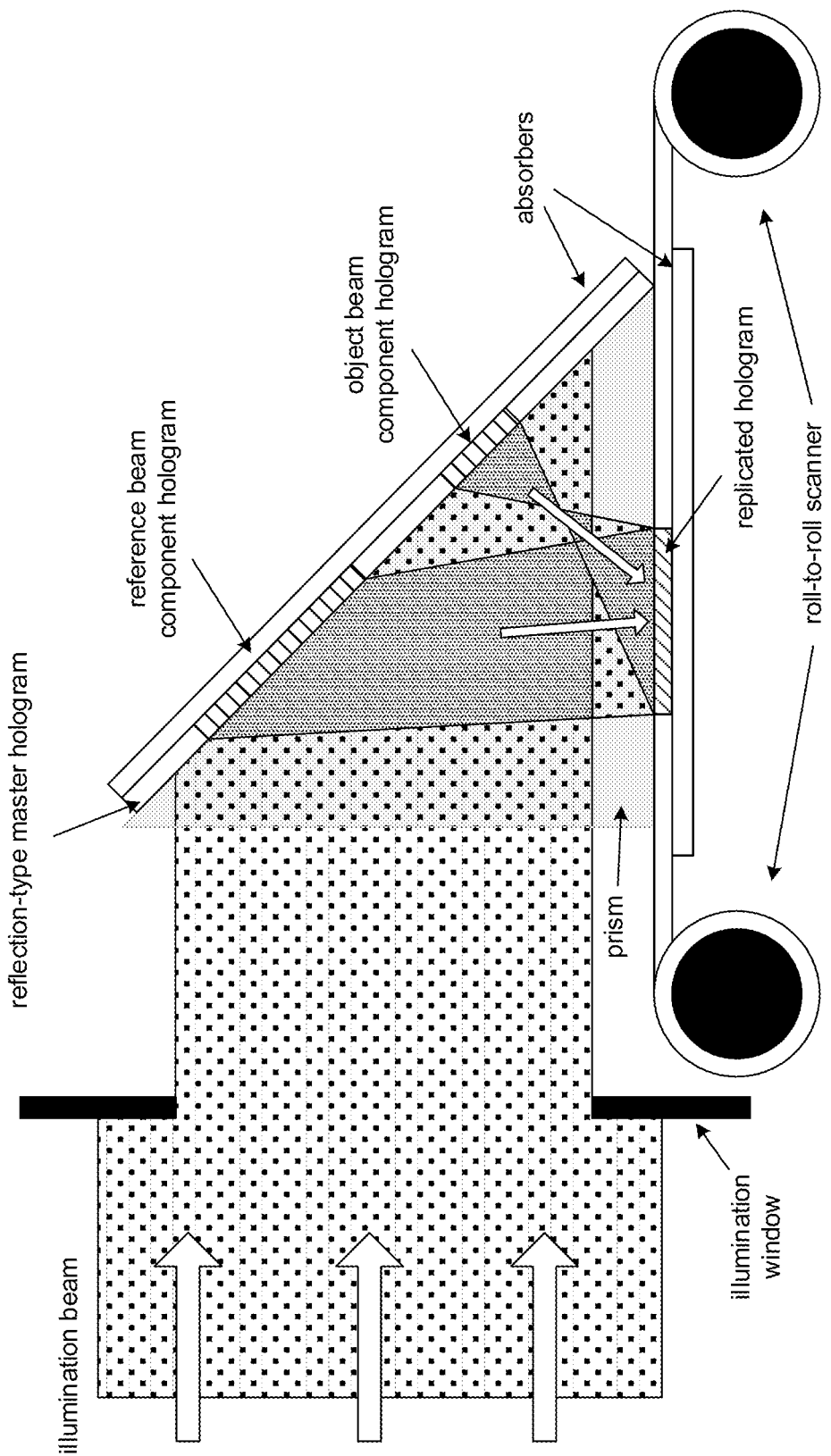
FIG. 2A illustrates a configuration for fabricating a transmission-type holographic element in accordance with an example embodiment.
Figure 2B:
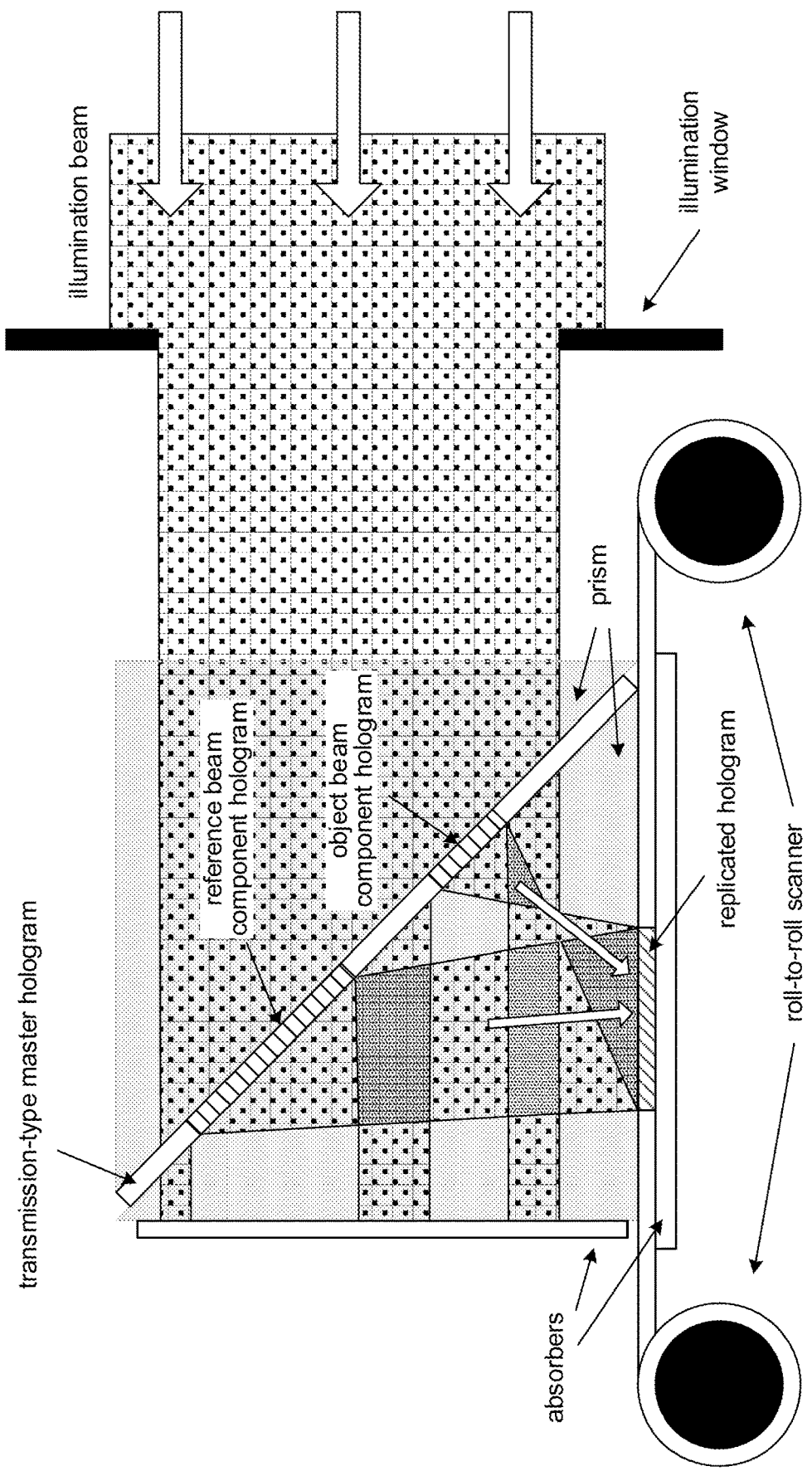
FIG. 2B illustrates a configuration for fabricating a transmission-type holographic element in accordance with another example embodiment.

FIGS. 2A and 2B illustrate configurations and operations for fabricating transmission holograms in accordance with example embodiments. In FIG. 2A, a reflection-type composite master hologram is placed in contact with the long face of a prism. The reflection-type composite master hologram includes a reference beam component hologram in a section thereof, and an object beam component hologram in another section thereof. One of the short faces of the prism is placed in contact with an unexposed photopolymer roll. The photopolymer is placed on a scanning machine which may be compatible with roll-to-roll manufacturing. An illumination beam from a coherent light source propagates through an illumination window towards the other short face of the prism (depicted with as beam illuminating the prism from the left side in FIG. 2A). Light transmits into the prism, preferably at normal incidence, and propagates towards the composite master hologram. Light from the illumination beam that interacts with the reference beam component hologram diffracts to form the reference beam for the replication hologram exposure. Light that interacts with the object beam component hologram diffracts to form the object beam for the replication hologram exposure. The apertures of the component holograms in the master hologram are defined to form the desired aperture of the replication hologram. The generated object and reference beams then form an interference pattern within the replication hologram and are exposed for a duration of time and processed to form the hologram. Absorbers are placed on the other face of the master hologram and on the replication hologram to absorb the unwanted incident and $0^{th}$ order light and to reduce stray light. In this patent document, the terms copy HOE and photopolymer are used interchangeably to denote the to-be-produced HOE. In some instances, the term unexposed photopolymer is used to convey the state of the material prior to receiving a holographic exposure.

A related configuration can be used to form transmission holograms using a transmission style master hologram shown in FIG. 2B. In this configuration, a transmission-type composite master hologram is placed in between two prisms. The transmission-type composite master hologram includes a reference beam component hologram in a section thereof, and an object beam component hologram in another section thereof. The illumination beam passes through illumination window, enters the first (upper) prism, and is incident on the transmission-type composite master hologram. Light interacts with the transmission-type composite hologram to form the reference and object beams that propagate through the second (lower) prism for the replication hologram exposure. The $0^{th}$ order light and light that was not diffracted by the master hologram are absorbed by the absorbers that are placed on a short face of the second prism and on the photopolymer below at least the location of the replication hologram.

The configurations in FIGS. 2A and 2B can be used for high-volume production of transmission-type holograms that use a reflection- or a transmission-type master hologram in the replication process.

Example Configurations for Producing Master Holograms

Figure 3A:
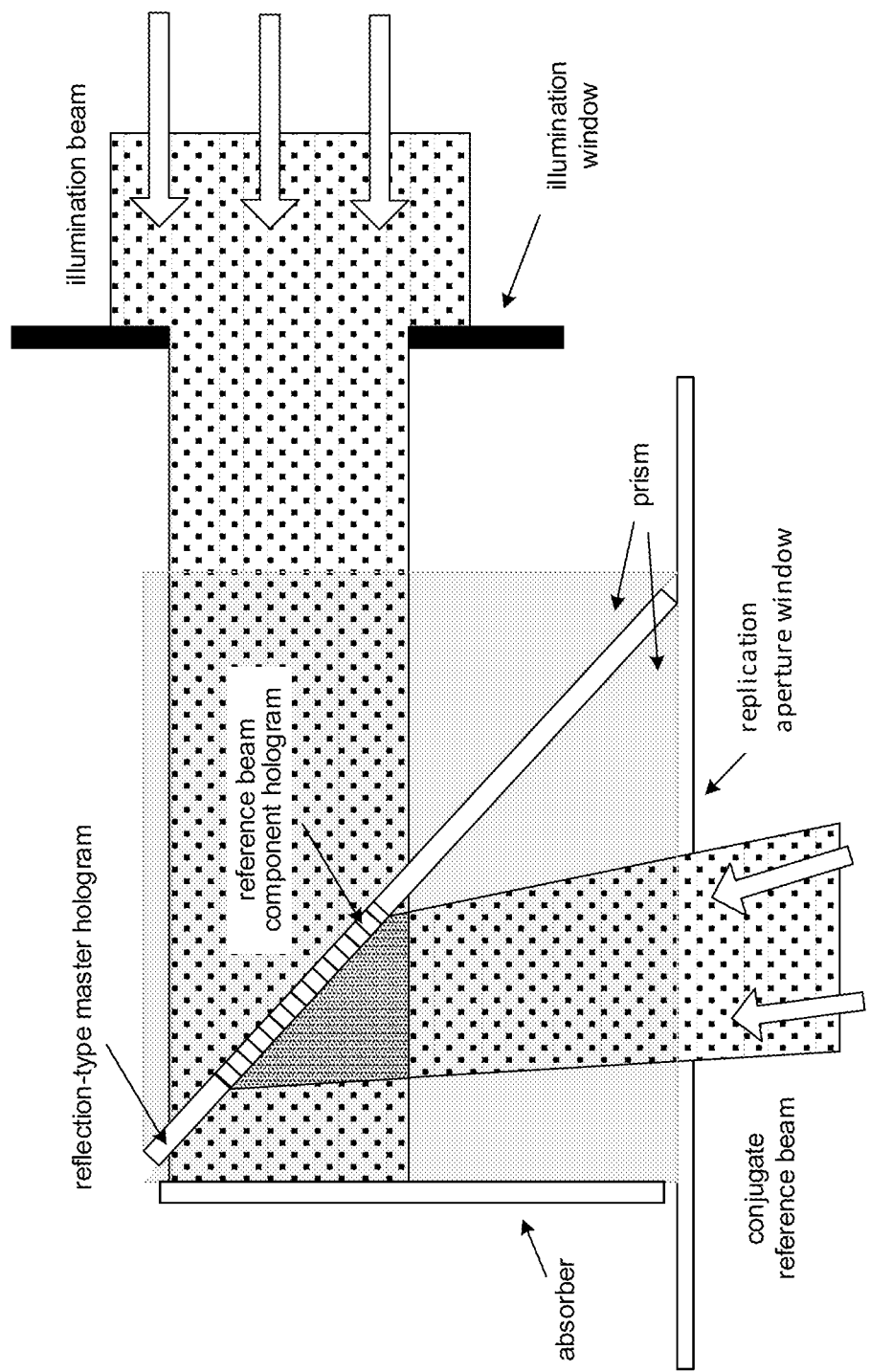
FIG. 3A illustrates a configuration and a first part a procedure for fabricating a reflection-type master holographic element in accordance with an example embodiment.
Figure 3B:
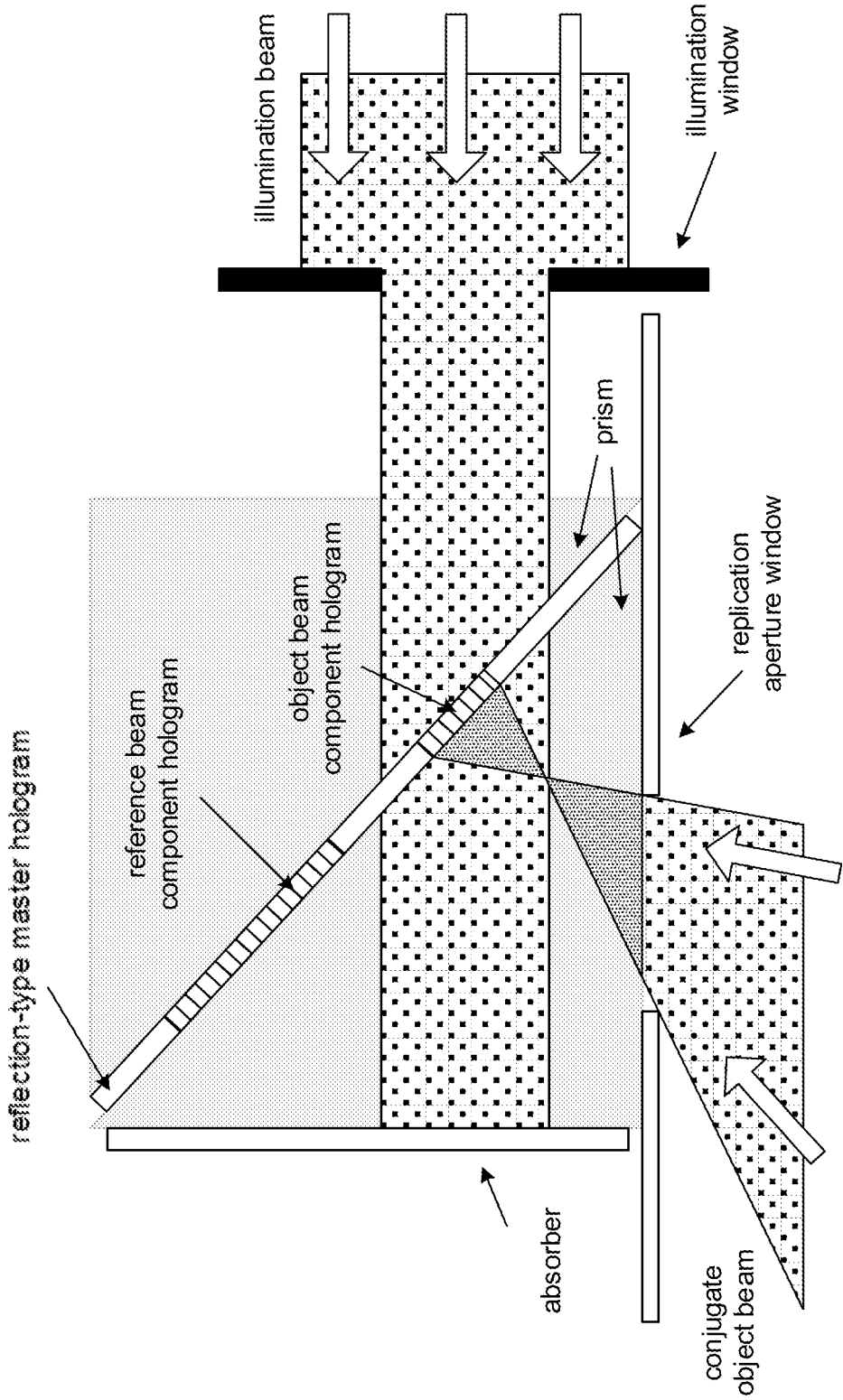
FIG. 3B illustrates a configuration and a second part the procedure for fabricating a reflection-type master holographic element in accordance with an example embodiment.

FIGS. 3A and 3B illustrate a configuration and associated operations for fabrication a reflection-type composite master hologram that can be used in FIG. 2A in accordance with an example embodiment. As illustrated in FIG. 3A, unexposed photopolymer (labeled as reflection-type master hologram, to-be-produced) is placed in contact between two prisms. An illumination beam passes through a window limiting the aperture of the beam and is transmitted through the first (upper) prism and propagates towards the unexposed photopolymer. The conjugate reference beam is transmitted through the replication hologram aperture on the lower face of the second (lower) prism and towards the photopolymer film. The conjugate reference beam and illumination beam form an interference pattern that forms the reference beam component hologram after a duration of exposure. The illumination window is then adjusted for the second exposure, as illustrated in FIG. 3B. The conjugate object beam is transmitted through the replication hologram aperture through the bottom face of the prism and towards the photopolymer, forming the object beam component hologram. The photopolymer film is then processed to form the reflection-type composite master hologram.

Figure 4A:
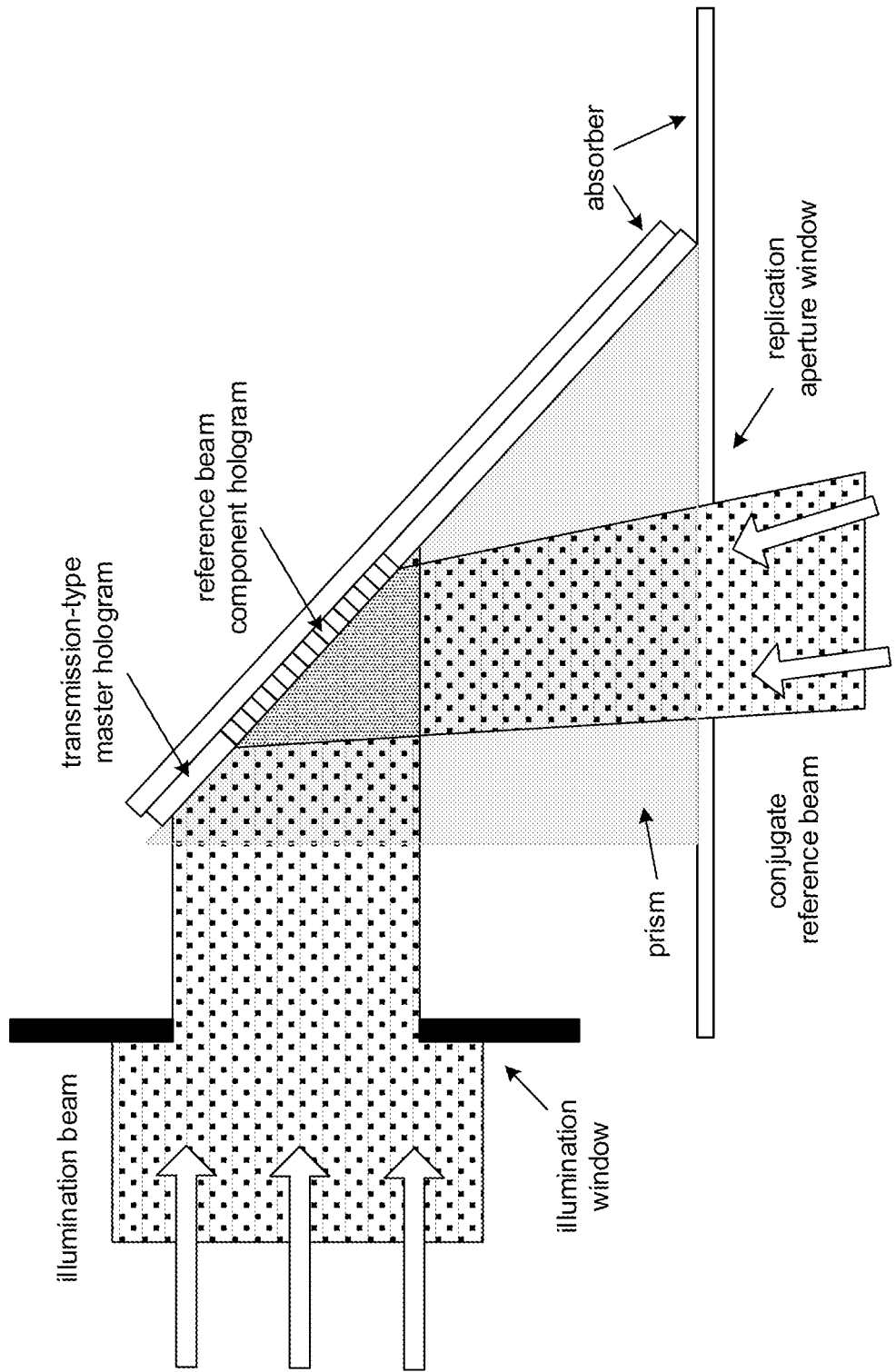
FIG. 4A illustrates a configuration and a first part a procedure for fabricating a transmission-type master holographic element in accordance with an example embodiment.
Figure 4B:
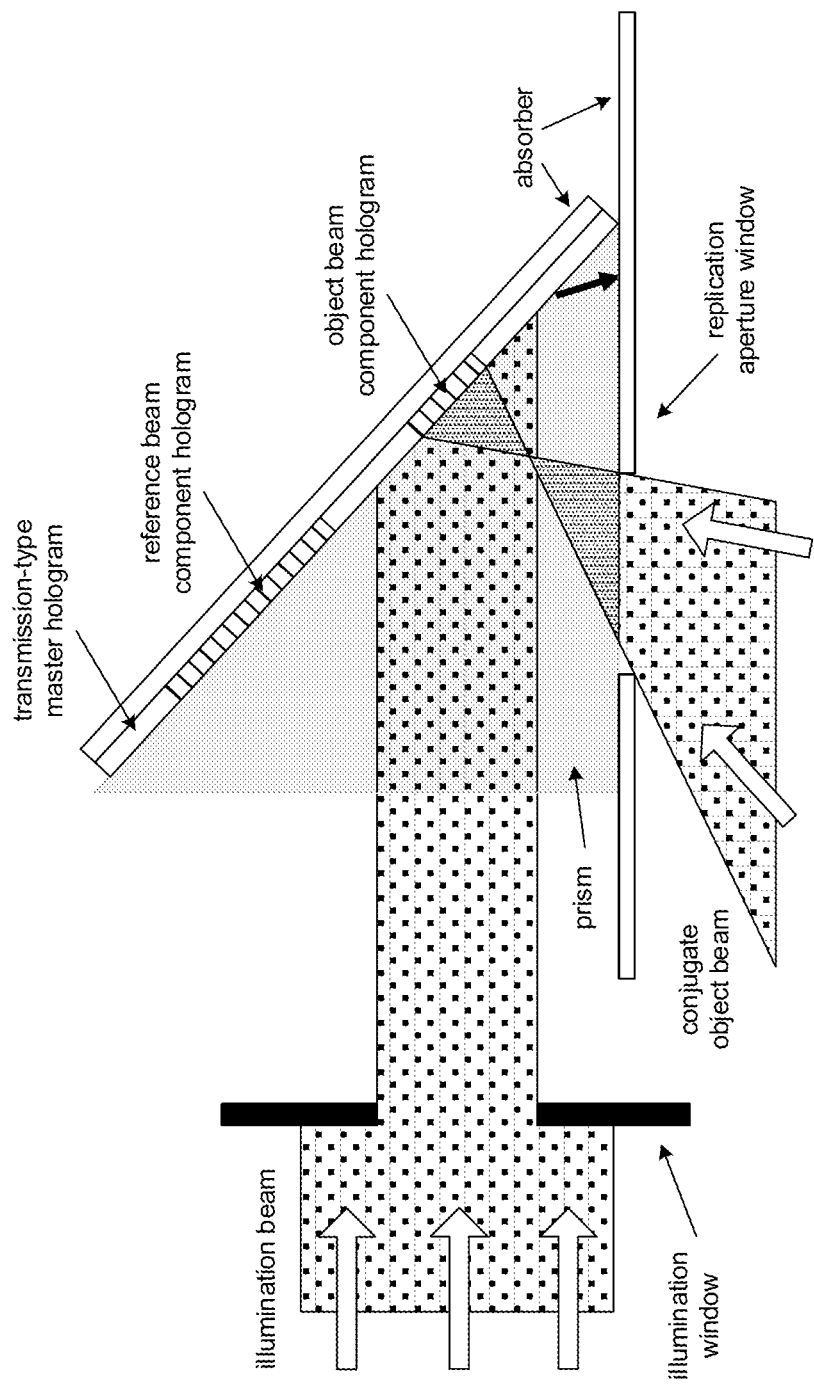
FIG. 4B illustrates a configuration and a second part the procedure for fabricating a transmission-type master holographic element in accordance with an example embodiment.

FIGS. 4A and 4B illustrate a similar configuration and process that can be used to form the transmission-type master hologram, such as the one illustrated in FIG. 2B, in accordance with an example embodiment. Sequential exposures (FIG. 4A illustrates the first exposure; FIG. 4B illustrates the second exposure) to form the component holograms are implemented similarly as in the fabrication of the reflection-type master hologram described in connection with FIGS. 3A and 3B. As illustrated in FIGS. 4A and 4B, the unexposed the photopolymer is placed on one face of the single prism with an absorber positioned behind the photopolymer. Illumination beam that is incident from the left side is limited by an adjustable window to provide the object beams for each of the two exposure steps, while the conjugate object and reference beams are transmitted through the replication hologram aperture on the bottom face of the prism. After both exposures, the transmission-type composite master hologram is processed to form the transmission-type composite master hologram.

A prism or other optical element may be used to allow the conjugate reference or object beams to exceed the critical angle during fabrication of the master hologram but are not shown in the figures. For example, if the construction object beam is a planar beam at a 45-degree angle within the photopolymer material, then a right-angle prism may be attached to the bottom of the replication aperture to achieve this angle.

Example Configurations for Producing Reflection-Type Holograms

One configuration for fabricating reflection holograms includes a pair of master holograms that are attached to prisms on both sides of the replication photopolymer. The prism and master hologram on the upper side of the replication photopolymer generate the object beam while the prism and master hologram on the lower side generate the reference beam. Both master holograms can be formed using a similar technique as used for fabricating the master holograms previously described. One disadvantage of this configuration is that it would require dual beam paths to illuminate both master holograms which can reduce the stability and increase the complexity of the replication system.

Figure 5:
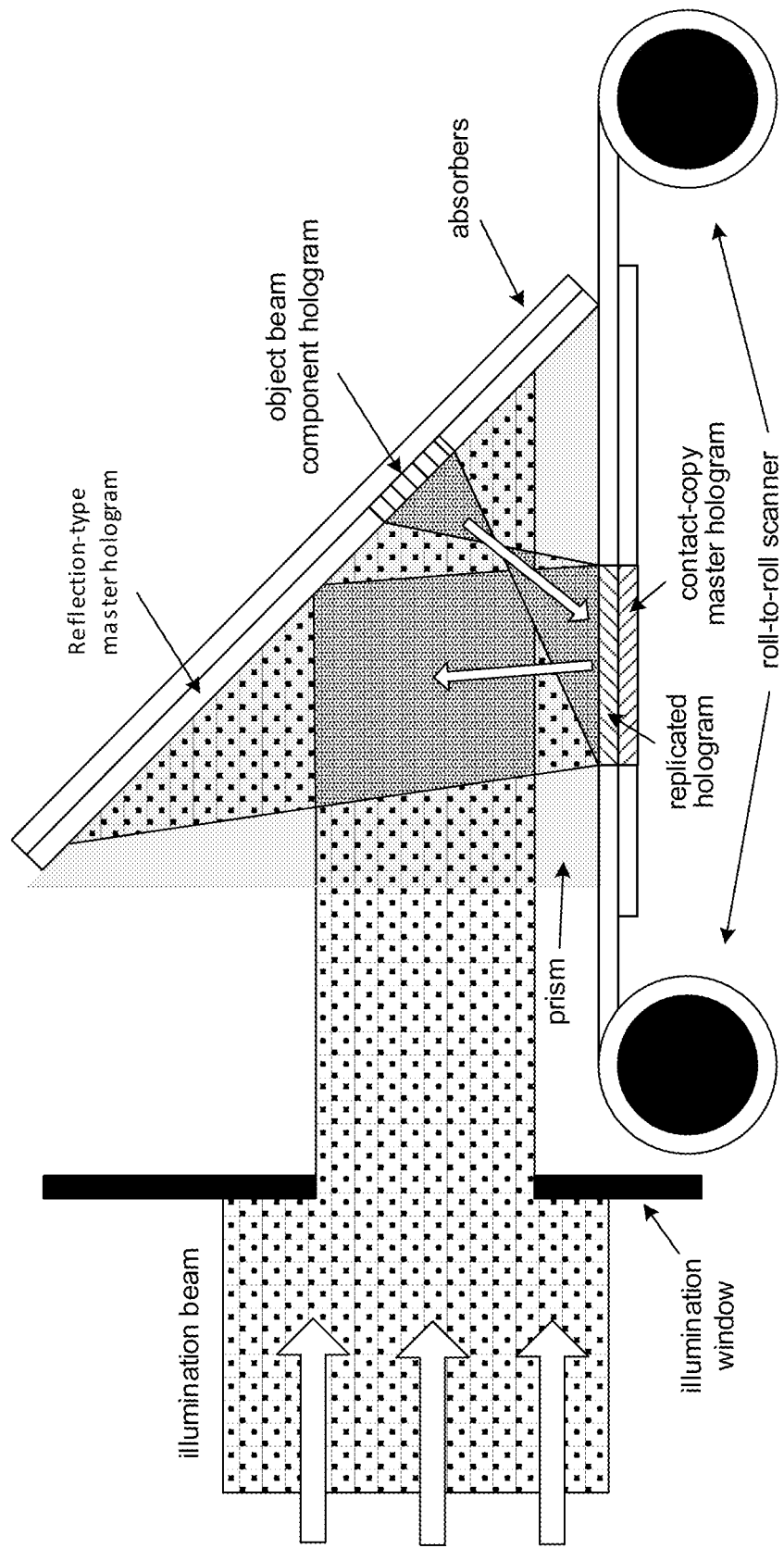
FIG. 5 illustrates a configuration and a procedure for fabricating a reflection-type holographic element in accordance with an example embodiment.

An alternative, hybrid technique, as illustrated in FIG. 5, can be used for fabricating replication holograms which combines prism-attached master holograms and contact-copy master holograms. In this configuration, the object beam is generated using a reflection-type master hologram attached to a prism in a similar way as done for fabricating transmission-type holograms described earlier in this patent document (see, e.g., FIG. 2A). An additional contact-copy master hologram is positioned below the replication photopolymer. The remaining components in FIG. 5 are similar to those described in earlier figures. Light from the illumination beam propagates towards the reflection-type master hologram attached to the prism, diffracts and generates the object beam, and diffracts towards the replication photopolymer. Light is transmitted through the photopolymer to the contact-copy master hologram attached to the bottom of the film. The contact-copy master hologram then diffracts to generate the reference beam. The generated object and reference beams then interfere to form the interference exposure in the replication photopolymer. The technique can also be altered so that the master hologram attached to the prism generates the reference beam instead of the object beam and the contact-copy hologram correspondingly generates the object beam instead of the reference beam. Although requiring two separate master holograms, this technique still simplifies and improves replication systems when compared to contact-copy when fabricating complex reflection holograms that have non-planar object or reference beams. After properly developing the master holograms, the replication system still uses only a single beam which can be aligned at normal incidence.

Figure 6A:
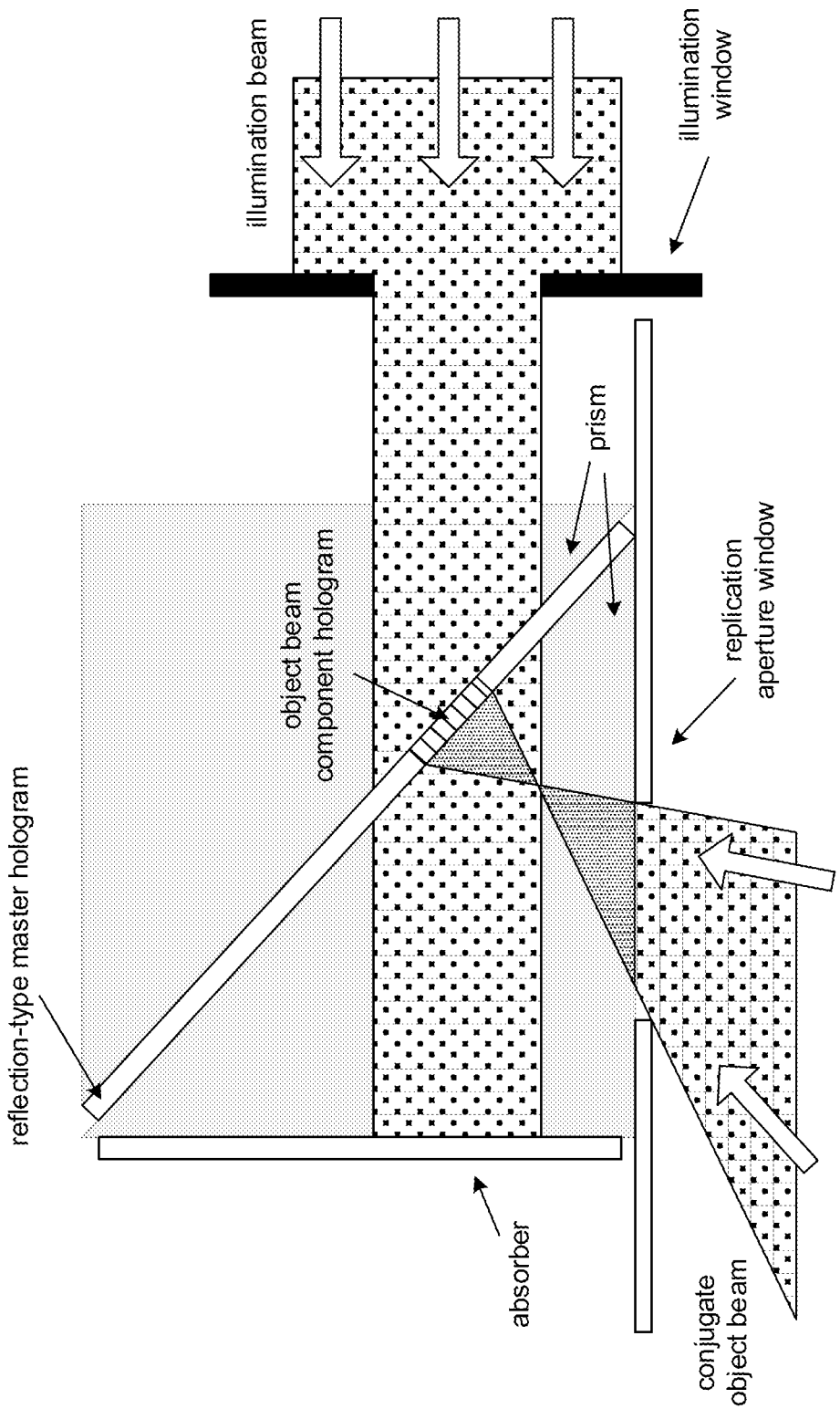
FIG. 6A illustrates a configuration and a first part a procedure for fabricating a master holographic element suitable for use in the configuration of FIG. 5 in accordance with an example embodiment.
Figure 6B:
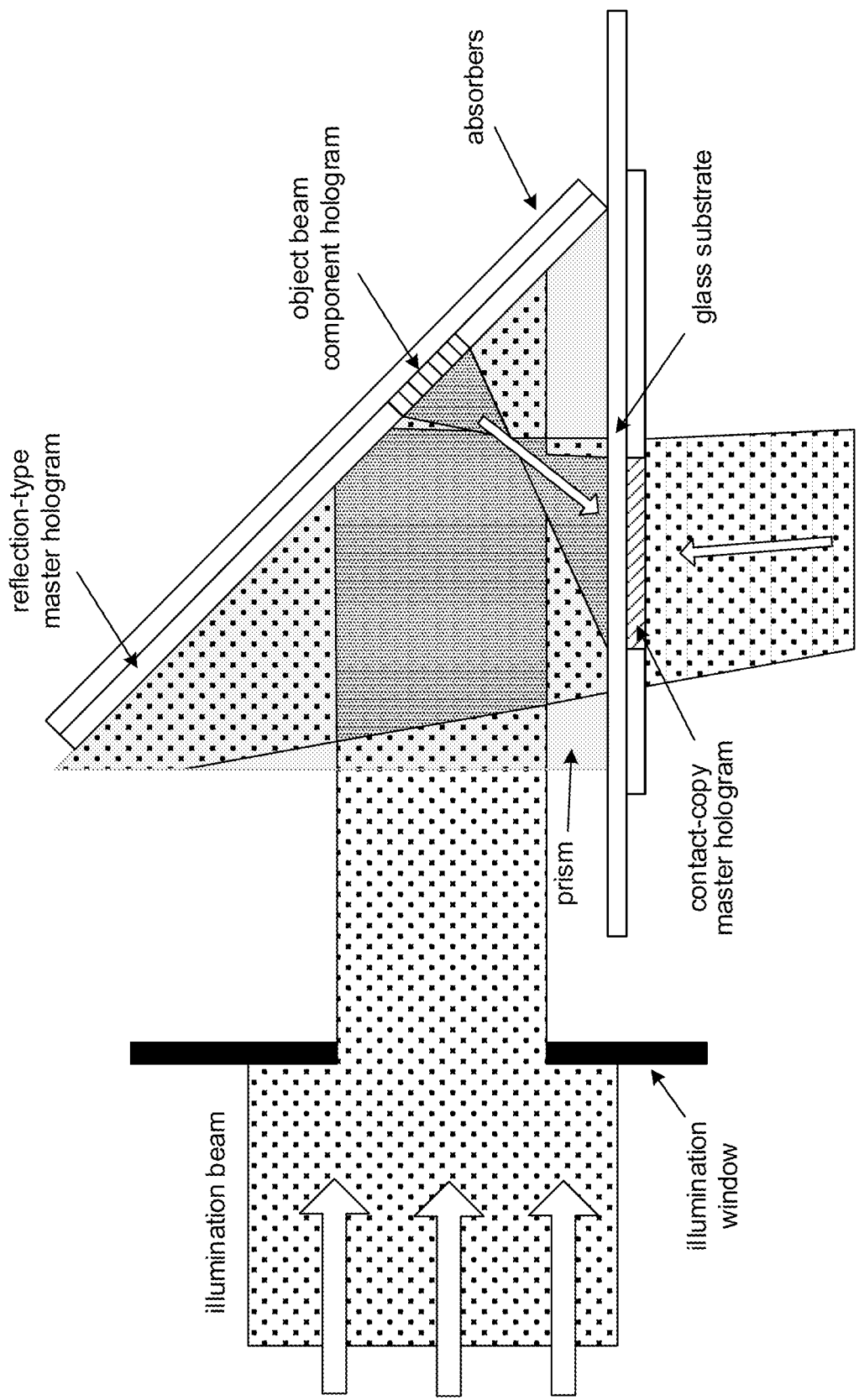
FIG. 6B illustrates a configuration and a second part the procedure for fabricating a master holographic element suitable for use in the configuration of FIG. 5 in accordance with an example embodiment.

The master holograms that are used in FIG. 5 can be fabricated using the technique s and configurations that are illustrated in FIGS. 6A and 6B. In FIG. 6A, the object beam component hologram is formed using similar techniques as described for fabricating transmission holograms (see, e.g., FIG. 4A). Instead of sequential exposures to form the reference beam and object beam components of the master hologram, a single exposure is formed to fabricate the object beam component hologram (FIG. 6A), followed by another procedure to form the reference beam component hologram in the contact-copy master hologram (FIG. 6B).

In particular, FIG. 6A illustrates a photopolymer material (to-be-produced reflection-type master hologram of FIG. 5) that is positioned between two prisms. Illumination beam is incident, limited by the illumination window, enters the first (upper) prism and the conjugate object beam enters the second (lower) prism via the replication aperture window. The two beams interact at the interface of the two prisms to form the object beam component hologram. In FIG. 6B, only one prism is used, and a photopolymer (to-be-produced contact-copy master hologram of FIG. 5) is positioned in contact with a glass substrate, which in turn is in contact with the lower face of the prism. The remaining components of FIG. 6B are similar to those described in connection with earlier figures. The object beam component hologram (fabricated based on FIG. 6A operations) is used to form one of the exposing beams in combination with the conjugate reference beam from the rear side of the hologram to form the reference beam component hologram in the contact-copy master hologram. It is not necessary to limit the light from the conjugate reference beam with an aperture since the object beam component hologram will form the limiting aperture as long as the conjugate reference beam overfills the intended replication hologram aperture as shown in the figure.

The disclosed embodiment can be used in industrial manufacturing of volume holographic elements. The technology is particularly well-suited for fabrication of holograms where one or both of the construction beams are beyond the total internal reflection (TIR) limit or are non-planar. These types of holograms are used in, for example, near-eye displays, augmented reality displays, and solar energy systems. In particular, in prior systems that require an airgap between the prism and the position polymer film, TIR limits the range of angles to below 43 and 31 degrees for refractive index values of 1.45 and 1.9, respectively, while the disclosed embodiments extend the range of angles for each of those indices up to 90 degrees.

Figure 7:
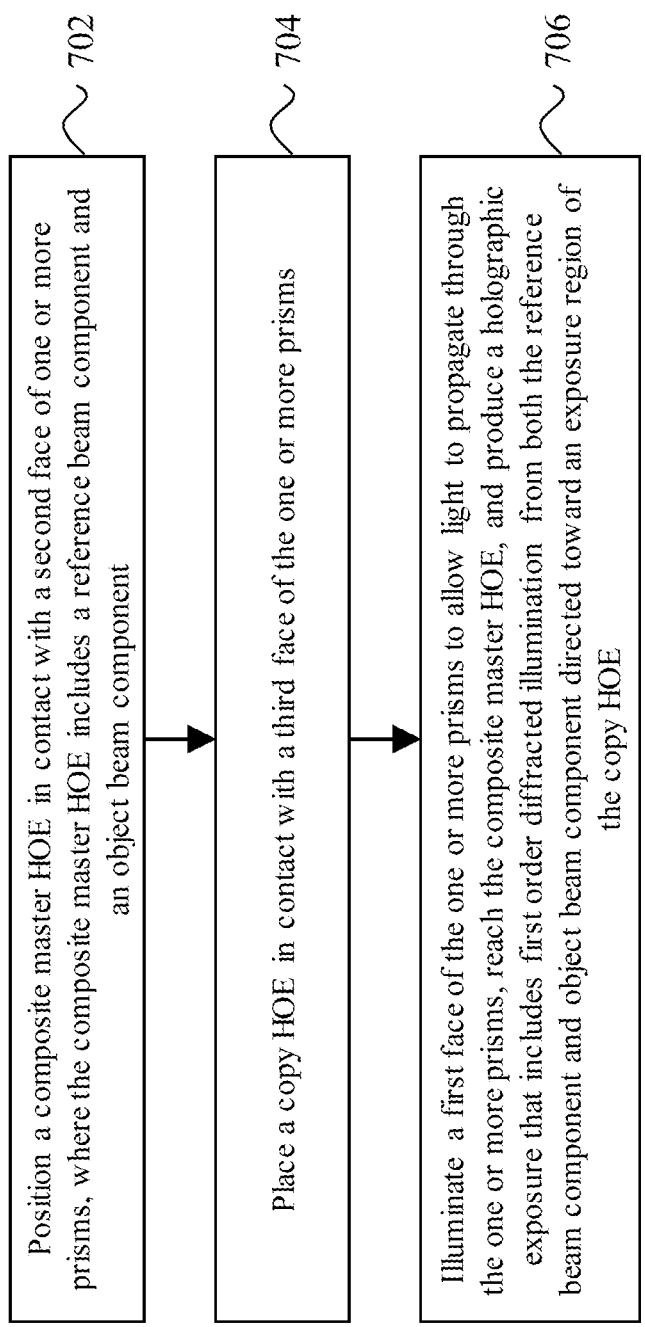
FIG. 7 illustrates a set of operations for replicating transmission-type holographic optical elements in accordance with an example embodiment.

FIG. 7 illustrates a set of operations for replicating transmission-type holographic optical elements in accordance with an example embodiment. The procedure in FIG. 7 can be used in connection with, for example, FIGS. 2A and 2B. At 702, a composite master HOE is positioned in contact with a second face of one or more prisms; the composite master HOE includes a reference beam component and an object beam component. At 704, a copy HOE is placed in contact with a third face of the one or more prisms. As noted earlier, the term copy HOE is used to denote the HOE that is to be produced or replicated from the master HOE. At 706, a first face of the one or more prisms is illuminated to allow light to propagate through the one or more prisms, reach the composite master HOE, and produce a holographic exposure comprising first order diffracted illumination from both the reference beam component and the object beam component directed toward an exposure region of the copy HOE. In some embodiments, the operations further include moving the copy HOE to expose an additional exposure area on the copy HOE, and illuminating the first face of the one or more prisms to replicate the holographic exposure at the additional exposure area.

Figure 8:
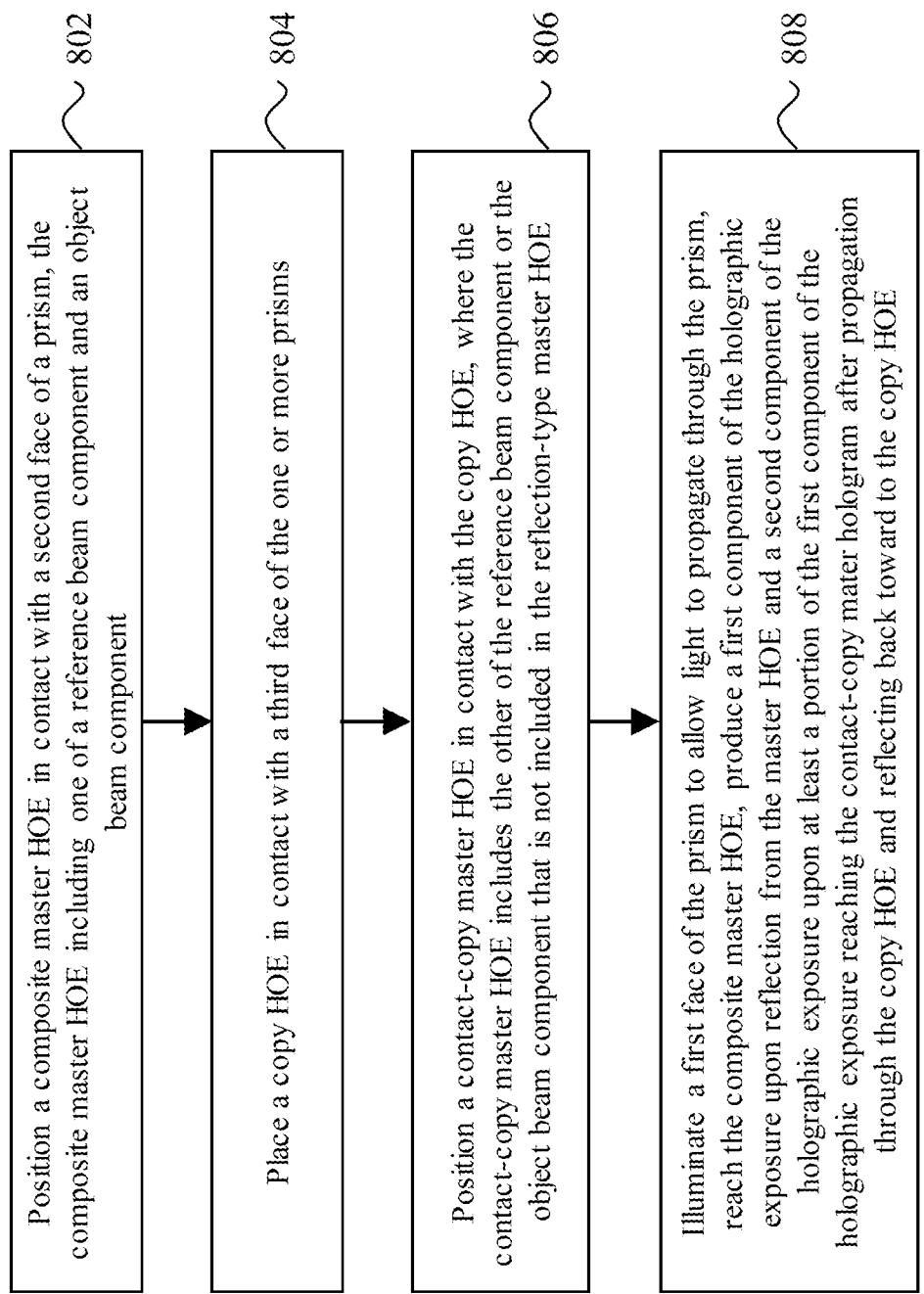
FIG. 8 illustrates a set of operations for replicating reflection-type HOEs in accordance with an example embodiment.

FIG. 8 illustrates a set of operations for replicating reflection-type HOEs in accordance with an example embodiment. The procedure in FIG. 8 can be used in connection with, for example, FIG. 5. At 802, a composite master HOE is positioned in contact with a second face of a prism, where the composite master HOE includes one of a reference beam component and an object beam component. At 804, a copy HOE is placed in contact with a third face of the one or more prisms. At 806, a contact-copy master HOE is positioned in contact with the copy HOE, where the contact-copy master HOE includes the other of the reference beam component or the object beam component that is not included in the reflection-type master HOE. At 808, a first face of the prism is illuminated to allow light to propagate through the prism, reach the composite master HOE, produce a first component of the holographic exposure upon reflection from the master HOE and produce a second component of the holographic exposure upon at least a portion of the first component of the holographic exposure reaching the contact-copy mater HOE after propagating through the copy HOE and reflecting back toward to the copy HOE.

Figure 9:
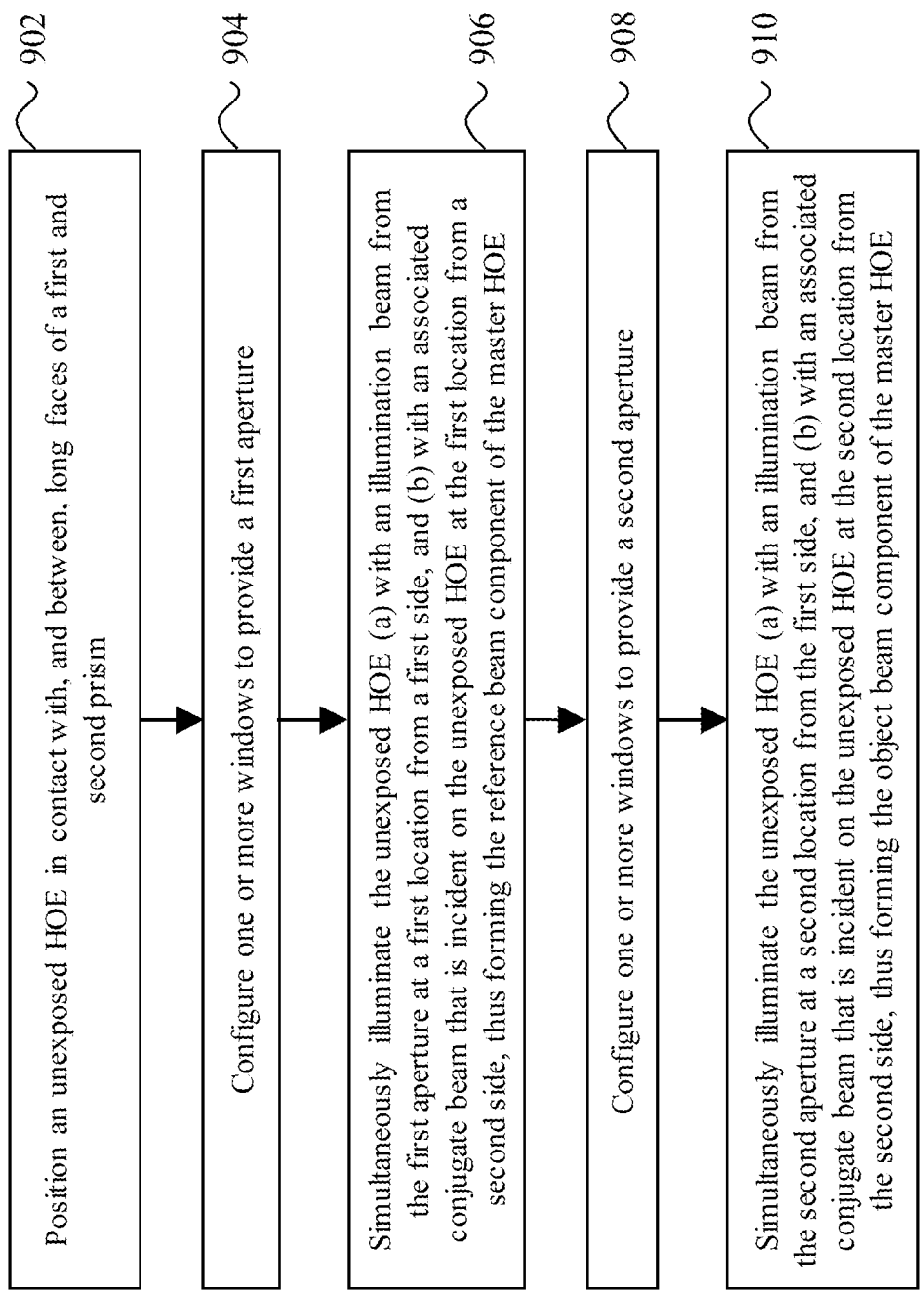
FIG. 9 illustrates a set of operations for producing a reflection-type master HOE that includes a reference beam component and an object beam component in accordance with an example embodiment.

FIG. 9 illustrates a set of operations for producing a reflection-type master HOE that includes a reference beam component and an object beam component in accordance with an example embodiment. The procedure in FIG. 9 can be used in connection with, for example, FIGS. 3A and 3B. At 902, an unexposed HOE is positioned in contact with, and between, long faces of a first and second prism. At 904, one or more windows are configured to provide a first aperture. At 906, simultaneous illumination is provided to the unexposed HOE (a) with an illumination beam from the first aperture at a first location from a first side, and (b) with an associated conjugate beam that is incident on the unexposed HOE at the first location from a second side, thus forming the reference beam component of the master HOE. At 908, the one or more windows are configured to provide a second aperture. At 910, simultaneous illumination is provided to the unexposed HOE (a) with an illumination beam from the second aperture at a second location from the first side, and (b) with an associated conjugate beam that is incident on the unexposed HOE at the second location from the second side, thus forming the object beam component of the master HOE.

Figure 10:
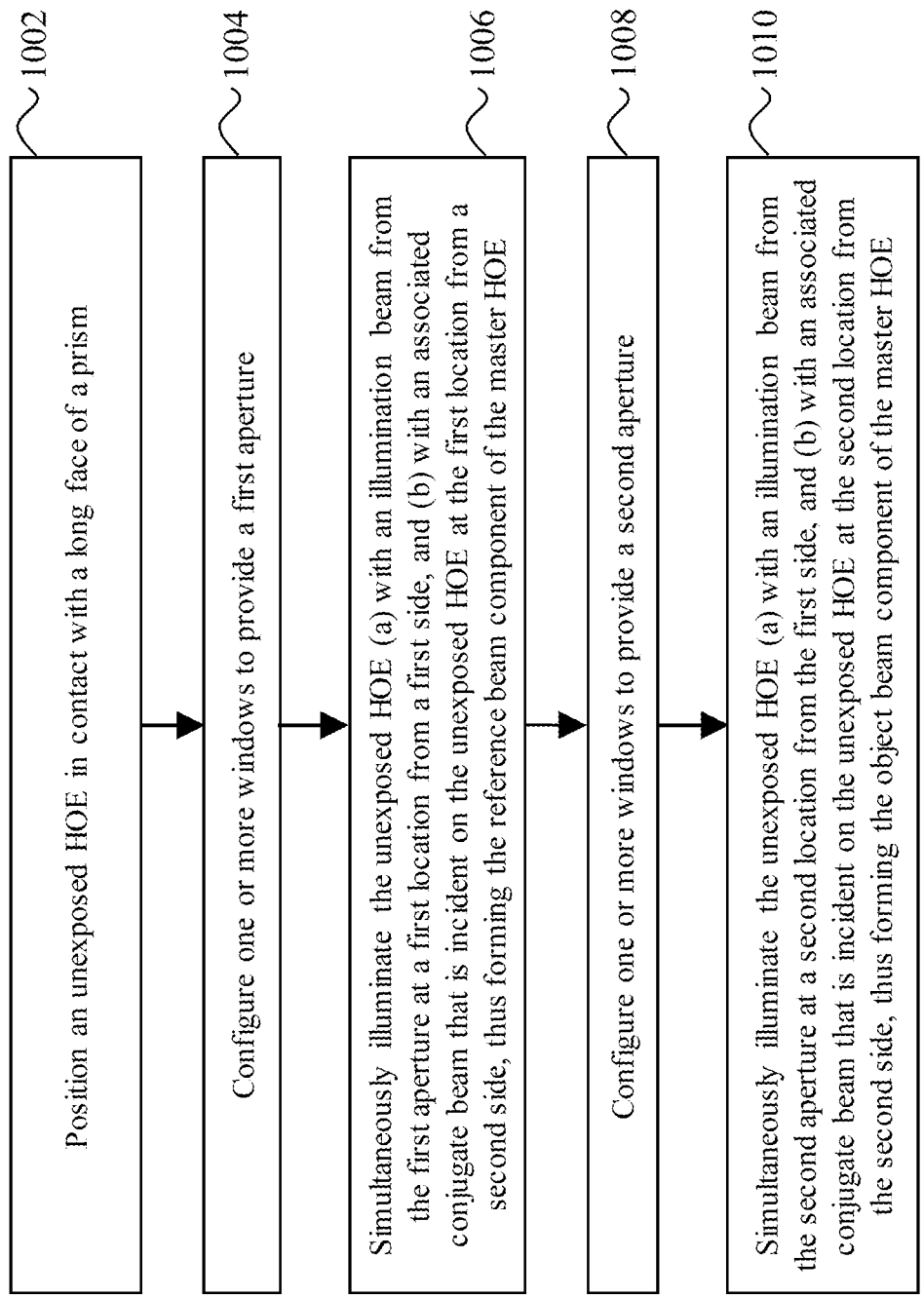
FIG. 10 illustrates a set of operations for producing a transmission-type master HOE that includes a reference beam component and an object beam component in accordance with an example embodiment.

FIG. 10 illustrates a set of operations for producing a transmission-type master HOE that includes a reference beam component and an object beam component in accordance with an example embodiment. The procedure in FIG. 10 can be used in connection with, for example, FIGS. 4A and 4B. At 1002, an unexposed HOE is positioned in contact with a long face of a prism. At 1004, one or more windows are configured to provide a first aperture. At 1006, simultaneous illumination is provided to the unexposed HOE (a) with an illumination beam from the first aperture at a first location from a first side, and (b) with an associated conjugate beam that is incident on the unexposed HOE at the first location from the first side, thus forming the reference beam component of the master HOE. At 1008, the one or more windows are configured to provide a second aperture. At 1010, simultaneous illumination is provided to the unexposed HOE (a) with an illumination beam from the second aperture at a second location from the first side, and (b) with an associated conjugate beam that is incident on the unexposed HOE at the second location from the first side, thus forming the object beam component of the master HOE.

One aspect of the disclosed embodiments relates to a system for replicating transmission-type HOEs that includes one or more prisms positioned to receive an illumination beam on a first face thereof, and a composite master HOE in contact with a second face of the one or more prisms to receive the illumination beam after propagation through the one or more prisms. The composite master HOE includes a reference beam component and an object beam component. The system further includes a copy HOE positioned in contact with a third face of the one or more prisms to receive, upon illumination of the master HOE by the illumination beam, a holographic exposure comprising first order diffracted illumination from both the reference beam component and object beam component at an exposure region of the copy HOE.

In one example embodiment, the above-noted system includes one or more absorbers positioned to receive and absorb one or more of: zeroth order diffracted light from the reference beam component of the master HOE, zeroth order diffracted light from the object beam component of the master HOE or stray light. In another example embodiment, the one or more prisms consist of a first prism that is positioned to receive the illumination beam on the first face thereof, the copy HOE is positioned in contact with the third face of the first prism, and the master HOE is a reflection-type HOE that is positioned in contact with a long face of the first prism to receive the illumination beam after propagation through the first prism and to reflect the first order diffracted illumination corresponding to the reference beam component and object beam component toward the exposure region of the copy HOE. In yet another example embodiment, the system includes a first and a second absorber, where the master HOE is positioned between the long face of the prism and the first absorber, and the copy HOE is positioned between the second absorber and the third face of the prism.

In another example embodiment, the one or more prisms include a first prism and a second prism that are positioned with their long faces facing each other. In this configuration, the second prism is positioned to receive the illumination beam on the first face thereof, the copy HOE is positioned in contact with the third face of the first prism, and the master HOE is a transmission-type HOE that is positioned between, and in contact with, the long faces of first prism and the second prism to receive the illumination beam after propagation through the second prism and to transmit the first order diffracted illumination corresponding to the reference beam component and object beam component toward the exposure region of the copy HOE. In still another example embodiment, the system includes a first and a second absorber, where the first absorber is positioned on a first face of the first prism, and the copy HOE is positioned between the second absorber and the third face of the first prism.

Another aspect of the disclosed embodiments relates to a system for replicating reflection-type HOEs that includes a prism positioned to receive an illumination beam on a first face thereof, and a reflection-type master HOE in contact with a second face of the prism. The reflection-type master HOE includes one of (a) a reference beam component or (b) an object beam component. The system further includes a copy HOE positioned in contact with a third face of the prism, and a contact-copy master hologram in contact with the copy HOE and including the other of the reference beam component or the object beam component that is not included in the reflection-type master HOE. In this system, the copy HOE is positioned in contact with, and between, the third face of the prism and the contact-copy master hologram. Further, the reflection-type master HOE is configured to receive the illumination beam after propagation through the prism and to reflect a first order diffracted light corresponding to the reference beam component or the object beam component toward an exposure area of the copy HOE. Additionally, the contact-copy master hologram is configured to receive the diffracted first order light after transmission through the copy HOE and to reflect another first order diffracted light corresponding to the reference beam component or the object beam component toward the exposure area of the copy HOE.

In one example embodiment, the reflection-type master HOE includes the reference beam component and the contact-copy master hologram includes the object beam component. In another example embodiment, the reflection-type master HOE includes the object beam component and the contact-copy master hologram includes the reference beam component. In yet another example embodiment, the system includes an absorber to receive and absorb zeroth order diffracted light or stray light, wherein the reflection-type master HOE is positioned between the second face of the prism and the absorber.

Another aspect of the disclosed embodiments relates to a system for producing a reflection-type master HOE that includes a reference beam component and an object beam component. The system includes a first prism and a second prism positioned with their long faces facing each other, an unexposed HOE positioned in contact with, and between, the long faces of the first and the second prisms, one or more windows to limit an aperture of an illumination beam incident on a first face of the second prism, and an additional window to limit an aperture of a conjugate beam incident on a third face of the first prism. In this system, the one or more windows that allow illumination of the first face of the second prism are configured to provide illumination beams onto different sections of the unexposed HOE corresponding to the reference beam component and the object beam component.

According to one example embodiment, the one or more windows comprise an adjustable aperture that is configured to produce the illumination beams of differing sizes. In some example embodiments, the system is configured to operate in a first configuration for producing the reference beam component, where the one or more windows are configured to provide a first aperture size for illuminating the unexposed HOE from a first side at a first location, and the additional window is configured to allow illumination of the unexposed HOE with the conjugate beam from a second side at the first location. The system can be configured to operate also operate in a second configuration for producing the object beam component, where the one or more windows are configured to provide a second aperture size for illuminating the unexposed HOE from the first side at a second location, and the additional window is configured to allow illumination of the unexposed HOE with the conjugate beam from the second side at the second location.

Another aspect of the disclosed embodiments relates to a system for producing a transmission-type master HOE that includes a reference beam component and an object beam component. The system includes a prism to receive an illumination beam, an unexposed HOE positioned in contact with a long face of the prism, one or more windows to limit an aperture of the illumination beam incident on a first face of the prism, and an additional window to limit an aperture of a conjugate beam incident on a third face of the prism. In this system, the one or more windows that allow illumination of the first face of the prism are configured to provide illumination beams of differing sizes onto different sections of the unexposed HOE corresponding to the reference beam component and the object beam component.

In one example embodiment, the system is configured to operate in a first configuration for producing the reference beam component, where the one or more windows are configured to provide a first aperture size for illuminating the unexposed HOE from a first side at a first location, and the additional window is configured to allow illumination of the unexposed HOE with the conjugate beam from the first side at the first location. The system can also be configured to operate in a second configuration for producing the object beam component, where the one or more windows are configured to provide a second aperture size for illuminating the unexposed HOE from the first side at a second location, and the additional window is configured to allow illumination of the unexposed HOE with the conjugate beam from the first side at the second location.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A system for replicating transmission-type holographic optical elements (HOEs), comprising:
   one or more prisms positioned to receive an illumination beam on a first face thereof;
   a composite master HOE in contact with a second face of the one or more prisms to receive the illumination beam after propagation through the one or more prisms, the composite master HOE including a reference beam component and an object beam component; and
   a copy HOE positioned in contact with a third face of the one or more prisms to receive, upon illumination of the composite master HOE by the illumination beam, a holographic exposure comprising first order diffracted illumination from both the reference beam component and object beam component at an exposure region of the copy HOE.

2. The system of claim 1, comprising one or more absorbers positioned to receive and absorb one or more of: zeroth order diffracted light from the reference beam component of the composite master HOE, zeroth order diffracted light from the object beam component of the composite master HOE or stray light.

3. The system of claim 1, wherein:
   the one or more prisms consist of a first prism that is positioned to receive the illumination beam on the first face thereof,
   the copy HOE is positioned in contact with the third face of the first prism, and
   the composite master HOE is a reflection-type HOE that is positioned in contact with a long face of the first prism to receive the illumination beam after propagation through the first prism and to reflect the first order diffracted illumination corresponding to the reference beam component and object beam component toward the exposure region of the copy HOE.

4. The system of claim 3, comprising a first and a second absorber, wherein the composite master HOE is positioned between the long face of the first prism and the first absorber, and the copy HOE is positioned between the second absorber and the third face of the first prism.

5. The system of claim 1, wherein:
   the one or more prisms include a first prism and a second prism that are positioned with their long faces facing each other, wherein the second prism is positioned to receive the illumination beam on the first face thereof,
   the copy HOE is positioned in contact with the third face of the first prism, and
   the composite master HOE is a transmission-type HOE that is positioned between, and in contact with, the long faces of first prism and the second prism to receive the illumination beam after propagation through the second prism and to transmit the first order diffracted illumination corresponding to the reference beam component and the object beam component toward the exposure region of the copy HOE.

6. The system of claim 5, comprising a first and a second absorber, wherein the first absorber is positioned on a first face of the first prism, and the copy HOE is positioned between the second absorber and the third face of the first prism.

7. A method for replicating transmission-type holographic optical elements (HOEs), comprising:
   positioning a composite master HOE in contact with a second face of one or more prisms, the composite master HOE including a reference beam component and an object beam component;
   placing a copy HOE in contact with a third face of the one or more prisms; and
   illuminating a first face of the one or more prisms to allow light to propagate through the one or more prisms, reach the composite master HOE, and produce a holographic exposure comprising first order diffracted illumination from both the reference beam component and the object beam component directed toward an exposure region of the copy HOE.

8. The method of claim 7, further comprising:
   moving the copy HOE to expose an additional exposure area on the copy HOE,
   and illuminating the first face of the one or more prisms to replicate the holographic exposure at the additional exposure area.

9. A system for replicating reflection-type holographic optical elements (HOEs), comprising:
   a prism positioned to receive an illumination beam on a first face thereof;
   a reflection-type master HOE in contact with a second face of the prism, the reflection-type master HOE including one of (a) a reference beam component or (b) an object beam component;
   a copy HOE positioned in contact with a third face of the prism; and
   a contact-copy master hologram in contact with the copy HOE and including the other of the reference beam component or the object beam component that is not included in the reflection-type master HOE, the copy HOE positioned in contact with, and between, the third face of the prism and the contact-copy master hologram, wherein
      the reflection-type master HOE is configured to receive the illumination beam after propagation through the prism and to reflect a first order diffracted light corresponding to the reference beam component or the object beam component toward an exposure area of the copy HOE, and
      the contact-copy master hologram is configured to receive the first order diffracted light after transmission through the copy HOE and to reflect another first order diffracted light corresponding to the reference beam component or the object beam component toward the exposure area of the copy HOE.

10. The system of claim 9, wherein the reflection-type master HOE includes the reference beam component and the contact-copy master hologram includes the object beam component.

11. The system of claim 9, wherein the reflection-type master HOE includes the object beam component and the contact-copy master hologram includes the reference beam component.

12. The system of claim 9, comprising an absorber to receive and absorb zeroth order diffracted light or stray light, wherein the reflection-type master HOE is positioned between the second face of the prism and the absorber.

13. A method for replicating reflection-type holographic optical elements (HOEs), comprising:
    positioning a reflection-type master HOE in contact with a second face of a prism, the composite master HOE including one of a reference beam component or an object beam component;
    placing a copy HOE in contact with a third face of the prism;
    positioning a contact-copy master HOE in contact with the copy HOE, the contact-copy master HOE including the other of the reference beam component or the object beam component that is not included in the reflection-type master HOE; and
    illuminating a first face of the prism to allow light to propagate through the prism, reach the reflection-type master HOE, produce a first component of the holographic exposure upon reflection from the reflection-type master HOE and a second component of the holographic exposure upon at least a portion of the first component of the holographic exposure reaching the contact-copy mater HOE after propagating through the copy HOE and reflecting back toward to the copy HOE.

14. A system for producing a reflection-type master holographic optical element (HOE) comprising a reference beam component and an object beam component, the system comprising:
    a first prism and a second prism positioned with their long faces facing each other;
    an unexposed HOE positioned in contact with, and between, the long faces of the first and the second prisms;
    one or more windows to limit an aperture of an illumination beam incident on a first face of the second prism; and
    an additional window to limit an aperture of a conjugate beam incident on a third face of the first prism, wherein
    the one or more windows that allow illumination of the first face of the second prism are configured to provide illumination beams onto different sections of the unexposed HOE corresponding to the reference beam component and the object beam component.

15. The system of claim 14, wherein the one or more windows comprise an adjustable aperture that is configured to produce the illumination beams of differing sizes.

16. The system of claim 14, configured to operate in:
    a first configuration for producing the reference beam component, wherein the one or more windows are configured to provide a first aperture size for illuminating the unexposed HOE from a first side at a first location, and the additional window is configured to allow illumination of the unexposed HOE with the conjugate beam from a second side at the first location, and
    a second configuration for producing the object beam component, wherein the one or more windows are configured to provide a second aperture size for illuminating the unexposed HOE from the first side at a second location, and the additional window is configured to allow illumination of the unexposed HOE with the conjugate beam from the second side at the second location.

17. A method for producing a reflection-type master holographic optical element (HOE) comprising a reference beam component and an object beam component, the method comprising:
    positioning an unexposed HOE in contact with, and between, long faces of a first and second prism;
    configuring one or more windows to provide a first aperture;
    simultaneously illuminating the unexposed HOE (a) with an illumination beam from the first aperture at a first location from a first side, and (b) with an associated conjugate beam that is incident on the unexposed HOE at the first location from a second side, thus forming the reference beam component of the reflection-type master HOE;
    configuring the one or more windows to provide a second aperture; and
    simultaneously illuminating the unexposed HOE (a) with an illumination beam from the second aperture at a second location from the first side, and (b) with an associated conjugate beam that is incident on the unexposed HOE at the second location from the second side, thus forming the object beam component of the reflection-type master HOE.

18. A system for producing a transmission-type master holographic optical element (HOE) comprising a reference beam component and an object beam component, the system comprising:
    a prism to receive an illumination beam;
    an unexposed HOE positioned in contact with a long face of the prism;
    one or more windows to limit an aperture of the illumination beam incident on a first face of the prism; and
    an additional window to limit an aperture of a conjugate beam incident on a third face of the prism, wherein
    the one or more windows that allow illumination of the first face of the prism are configured to provide illumination beams of differing sizes onto different sections of the unexposed HOE corresponding to the reference beam component and the object beam component.

19. The system of claim 18, configured to operate in:
    a first configuration for producing the reference beam component, wherein the one or more windows are configured to provide a first aperture size for illuminating the unexposed HOE from a first side at a first location, and the additional window is configured to allow illumination of the unexposed HOE with the conjugate beam from the first side at the first location, and
    a second configuration for producing the object beam component, wherein the one or more windows are configured to provide a second aperture size for illuminating the unexposed HOE from the first side at a second location, and the additional window is configured to allow illumination of the unexposed HOE with the conjugate beam from the first side at the second location.

20. A method for producing a transmission-type master holographic optical element (HOE) comprising a reference beam component and an object beam component, the method comprising:
    positioning an unexposed HOE in contact with a long face of a prism;

configuring one or more windows to provide a first aperture;

simultaneously illuminating the unexposed HOE (a) with an illumination beam from the first aperture at a first location from a first side, and (b) with an associated conjugate beam that is incident on the unexposed HOE at the first location from the first side, thus forming the reference beam component of the transmission-type master HOE;

configuring the one or more windows to provide a second aperture; and simultaneously illuminating the unexposed HOE (a) with an illumination beam from the second aperture at a second location from the first side, and (b) with an associated conjugate beam that is incident on the unexposed HOE at the second location from the first side, thus forming the object beam component of the transmission-type master HOE.

* * * * *